United States Patent [19]

Nakano et al.

[11] Patent Number: 4,477,752
[45] Date of Patent: Oct. 16, 1984

[54] SPEED CONTROL APPARATUS FOR DC MOTOR

[75] Inventors: Hiromitsu Nakano, Katano; Isao Yoshida, Suita, both of Japan

[73] Assignee: Matsushita Electric Industrial Co., Ltd., Kadoma, Japan

[21] Appl. No.: 353,420

[22] Filed: Mar. 1, 1982

[30] Foreign Application Priority Data

Mar. 18, 1981 [JP] Japan .................................. 56-39995

[51] Int. Cl.³ .............................................. G05B 5/00
[52] U.S. Cl. .................................. 318/331; 318/317; 318/345 B
[58] Field of Search ................ 307/297; 318/331, 317, 318/626, 345 B, 460, 345 F, 611

[56] References Cited
U.S. PATENT DOCUMENTS

| | | | |
|---|---|---|---|
| 4,189,666 | 2/1980 | Tetsugu et al. | 318/331 X |
| 4,234,835 | 11/1980 | Ofa et al. | 318/331 X |
| 4,272,709 | 6/1981 | Mizumoto et al. | 318/331 X |

Primary Examiner—Ulysses Weldon
Attorney, Agent, or Firm—Cushman, Darby & Cushman

[57] ABSTRACT

A speed control apparatus for DC motor (1), comprises a bridge circuit formed by the winding of the motor (1), a resistor (2) series thereto, and two resistors (3 and 4). Therein, a reference voltage ($E_r$) is produced by dividing a voltage $V_{ref}$ of a constant voltage circuit (20) by a divider network (21+22). The voltage difference this reference voltage ($E_r$) and a voltage produced across the detection output terminals "a" and "b" which is proportional to a counter electromotive force ($E_a$) of the DC motor (1) is amplified by a differential amplifier (23+24). A current mirror circuit is formed by transistors (16), (17) and (18). The first transistor (16) regulated of its collector current ($I_r$) by a constant current circuit (19) controls collector current of the second transistor (17), which controls input current of the constant voltage circuit (20). The third transistor (18) regulated of its collector current constantly controls the input current to the differential amplifier (23+24) for controlling the transistor (7) to control the motor current.

6 Claims, 3 Drawing Figures

SPEED CONTROL APPARATUS FOR DC MOTOR

BACKGROUND OF THE INVENTION

The present invention relates to a speed control apparatus for DC motor which reduces to a minimum undesirable change in revolution speed of the motor due to change of source voltage and which is suitable for constructing on a semiconductor integrated circuit.

Electrically controlling the speed of a DC motor utilizing counter electromotive force induced in the armature winding and proportional to the revolution speed of the DC motor to be controlled, is known. FIG. 1 shows a practical example of the apparatus for such method.

In the conventional apparatus of FIG. 1, an equivalent internal resistance $R_a$ of a DC motor 1 to be controlled, a resistor 2 of resistance $R_1$ joined in series with the DC motor and resistors 3 and 4 of resistances $R_2$ and $R_3$, respectively, joined in series form a bridge circuit. When equilibrium condition of the bridge (that is, $R_1 \cdot R_2 = R_3 \cdot R_a$) is fulfilled, the voltage across the detection output terminals "a" and "b" corresponds directly to the revolution (rotational) speed of the DC motor 1 and is not dependent on load torque or armature current of the DC motor 1. Therefore, by obtaining a difference voltage between a voltage which is proportional to counter electromotive force of the DC motor 1 and a reference voltage which is selected for defining a desired revolution speed, by amplifying the difference voltage by a differential amplifier and feeding an amplified output to a driver transistor 5, by driving a current controlling transistor 7 thereby, and by increasing or decreasing the current to the DC motor 1 when the revolution speed is lower or higher than the preset value, the revolution speed of the DC motor 1 can be controlled almost to the preset value. To produce the preset reference voltage, a current is fed through a resistor 9 to the diode 8. Forward voltage drop of the diode 8, which is substantially constant, is divided by a dividing network consisting of resistors 10 and 11, and the reference voltage is given across the resistor 11. The divided point of the dividing network 10+11 is connected to the base of a transistor 12 of a differential amplifier, and the terminal "b" (that is, the junction point of the resistors 3 and 4) is connected to the base of the other transistor 13 of the differential amplifier. The resistor 11 is connected between the terminal "a" and the base of the transistor 12, which is an input terminal "c" of the differential amplifier. A current is fed from the positive terminal of the DC power source 6 to the differential amplifier 12+13 through a resistor 14. A capacitor 15 prevents undesirable oscillation.

In the conventional speed control apparatus of FIG. 1, the controlled speed is influenced by changes of voltage of the power source 6 as follows:

The reference voltage which defines a selected revolution speed is given as a voltage across the resistor 11 which is produced by supplying a current from the power source 6 in the series circuit of a resistor 9, the diode 8 and the resistor 2, and dividing the forward voltage drop of the diode 8, as a constant voltage device, by the dividing network 10+11. Therefore, when the voltage of the power source 6 increases, the current in the series circuit consisting of the resistor 9, the diode 8 and the resistor 2 increases, and the forward voltage drop across the diode 8 increases, thereby increasing the voltage across the resistor 11. As the voltage across the resistor 11 increases, the revolution speed of the DC motor 1 increases. On the other hand, when the voltage of the power source 6 decreases, the current in the diode 8 decreases, thereby decreasing the forward voltage across the resistor 11. As the voltage across the resistor 11 decreases, the revolution speed of the DC motor 1 decreases. As mentioned, a problem in the conventional speed control apparatus of FIG. 1 is that as the power source voltage changes, the revolution speed of DC motor fluctuates considerably.

SUMMARY OF THE INVENTION

The present invention describes a method, in view of the problem of the above-mentioned conventional speed control apparatus, to provide an improved speed control apparatus whereby a constant motor speed is achieved irrespective of change of the power source voltage.

DESCRIPTION OF THE PREFERRED EMBODIMENTS

Figure 2:
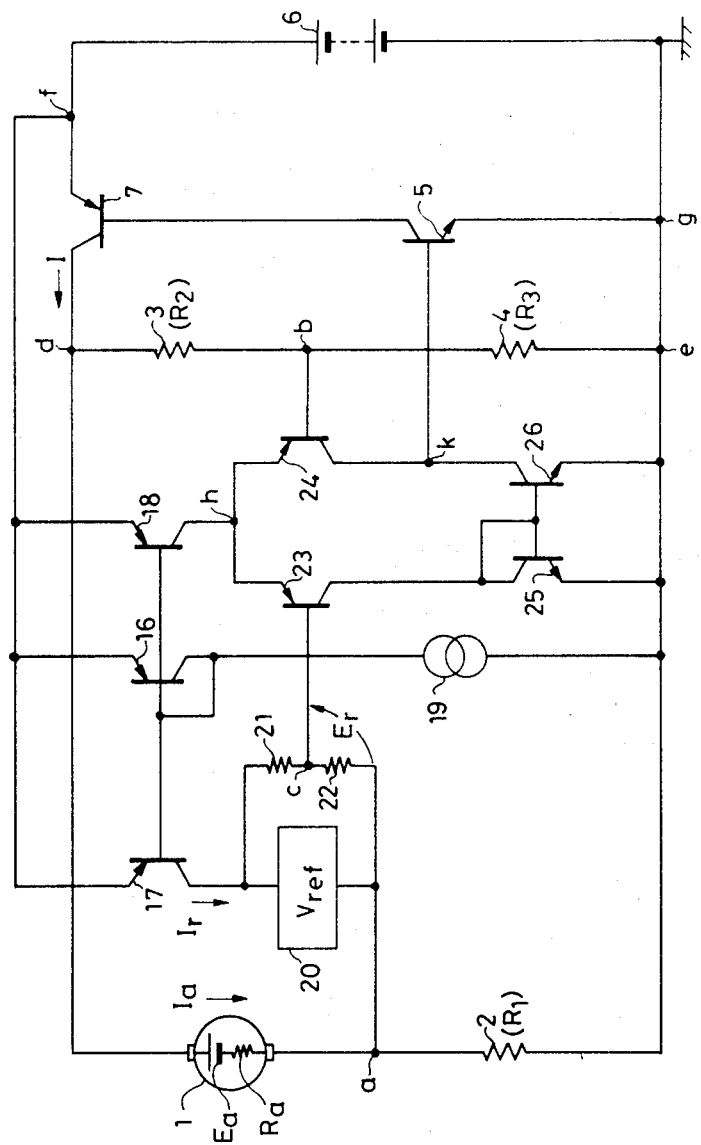
FIG. 2 is an exemplary circuit diagram of a speed control apparatus for DC motor embodying the present invention.

FIG. 2 shows a first example of speed control apparatus of DC motor embodying the present invention, wherein a DC motor 1 having an equivalent internal resistance $R_a$ and resistors 2, 3 and 4 having resistances of $R_1$, $R_2$ and $R_3$, respectively, form a bridge circuit having an equilibrium condition of $$R_1 \cdot R_2 = R_3 \cdot R_a \qquad (1),$$

The bridge circuit has current feeding terminals "d" and "e", and detection output terminals "a" and "b". A DC power source 6 is connected so as to feed current through a current controlling transistor 7 to the bridge circuit through the feeding terminals "d" and "e". Transistors 16, 17 and 18 forming a current mirror circuit are connected by their bases in common to each other and by their emitters in common to a positive end "f" of the DC power source 6. The collector of the transistor 16 is connected to the base thereof and through a constant current circuit 19 to a negative end "g" of the DC power source 6. The collector of the transistor 17 is connected through a constant voltage circuit 20 to the detection terminal "a" of the bridge circuit. A voltage dividing network 21+22 consisting of series connected resistors 21 and 22 is connected across the constant voltage circuit 20. The collector of the transistor 18 is connected to feeding terminal "h" of a differential amplifier consisting of transistors 23 and 24, and input terminals of the differential amplifier; that is, the bases of the transistors 23 and 24 are connected to the intermediate junction point "c" between the resistor 21 and the resistor 22 of the dividng network and to the detection output terminal "b", respectively, so that the voltage difference between the terminals "c" and "b" is amplified. A preset reference voltage is given across the resistor 22. Collectors of the transistors 23 and 24 are connected to the collectors of the transistors 25 and 26, respectively, as loads and the emitters of the load transistors 25 and 26 are connected to the negative end "g" of the DC power source. The bases of the transistors 25 and 26 are connected is common to the collector of the transistor 25, while junction point "k" of the collectors of the transistors 24 and 25 is connected to the base of a driver transistor 5, which is connected by its collector to the base of the current control transistor 7 and by its emitter to the negative end "g" of the DC power source 6.

Figure 1:
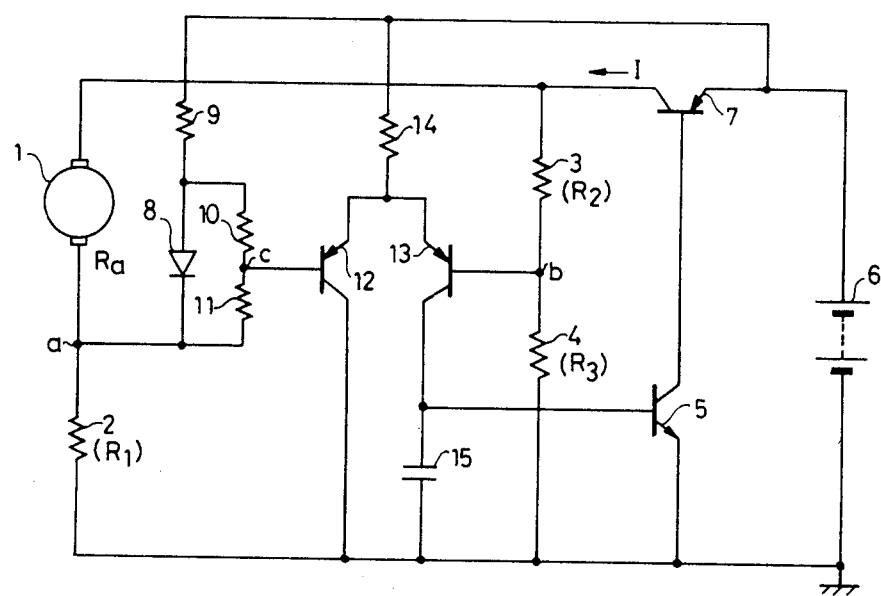
FIG. 1 is a circuit diagram of a conventional speed control apparatus for DC motor.

The speed control operation corresponding to the reference voltage given by the constant voltage circuit 20 in the circuit of FIG. 2 is substantially the same as that of the circuit of FIG. 1.

Operation of the embodiment of FIG. 2 in response to changes of the voltage of the DC power source 6 is as follows:

Since the transistor 17 forms a current mirror pair with the transistor 16 which is series connected with the constant current circuit 19, the collector current of the transistor 17 and, hence, the current to the constant voltage circuit 20 are controlled substantially constant irrespective of the voltage change of the power source 6, thereby attaining highly accurate control of the voltage of the circuit 20. Therefore, even with considerable change of the voltage of the power source 6, the voltage $V_{ref}$ of the constant voltage source and, hence, the reference voltage $E_r$ across the resistor 22, are retained constant. Therefore, even when the voltage of the DC power source 6 changes, the revolution speed of the DC motor 1 is retained substantially constant, and the stability of the revolution speed is improved in comparison with the conventional speed control apparatus for DC motor as shown in FIG. 1.

Figure 3:
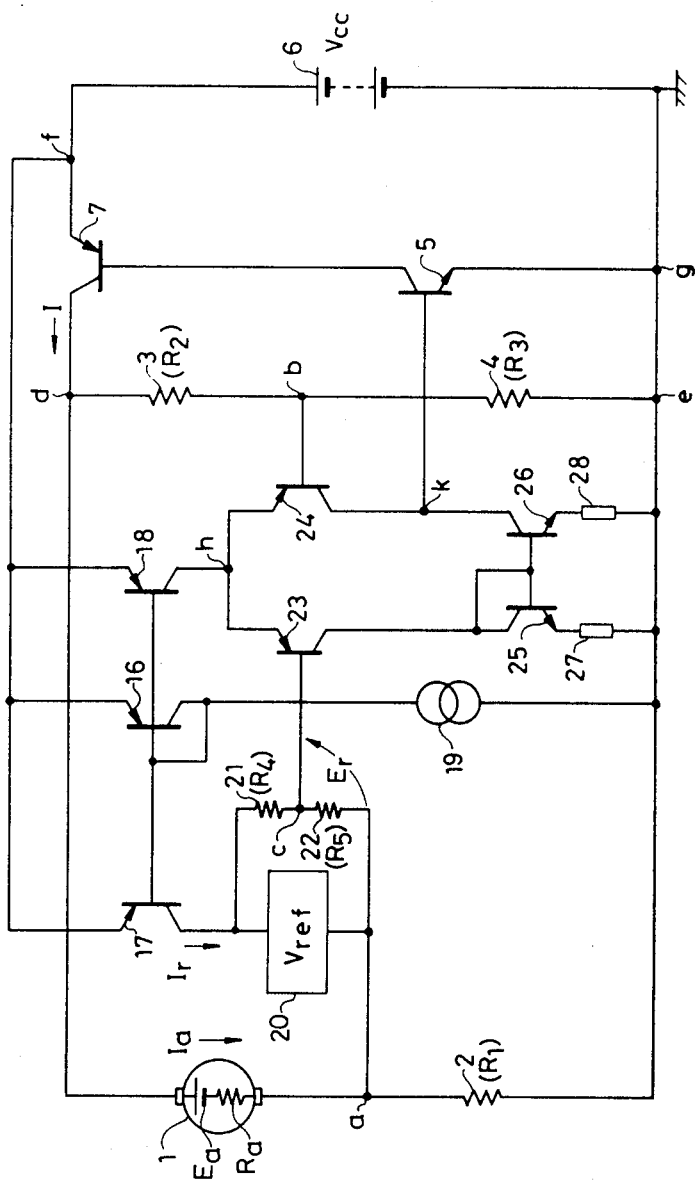
FIG. 3 is an examplary circuit diagram of a second and further improved speed control apparatus for DC motor embodying the present invention.

However, when a further high accuracy control of revolution speed is necessary, another problem arises when the voltage of the DC power source 6 changes substantially, although the emitter-collector voltage of the transistor 16 does not change, the emitter-collector voltage of the transistor 17 does change. Accordingly, by means of Early effect of the transistor (i.e., base-width modulation), the collector current of the transistor 17 changes to some extent. As a result, the input current to the constant voltage circuit 20 as well as, the reference voltage $E_r$ change, thereby changing the motor speed to some extent. Since the change of the $E_r$ as a result of the Early effect is small, the undesirable change of the motor speed thereby also is small. However, for a very high accuracy machine, such small change is still a problem. Therefore, a further improvement is made as shown in FIG. 3, wherein almost all parts are similarly constructed as those of FIG. 2, the corresponding components are designated by the same reference numerals and marks.

The apparatus of claim 3 differs from FIG. 2 only in that resistors 27 and 28 are inserted between the emitters of the transistors 25 and 26 and the negative ends of the DC power source 6, respectively. The resistors 27 and 28 are selected to have different resistances from each other.

Provided that the input impedances of the differential amplifier 23+24 is very large and hence the input current is negligibly small, and the transistors 23 and 24 of the differential amplifier and transistors 5 and 7 have large gains, and $V_{cc}$ is the voltage of the DC power source 6, $E_a$ is the counter electromotive force of the DC motor 1, $I_a$ is the armature current of the DC motor 1, $I_r$ is the collector current of the transistor 17, $R_4$ is the resistance of the resistor 21, $R_5$ is the resistance of the resistor 22, $K_a$ is a power generation constant, $V_{ref}$ is the constant voltage produced by the constant voltage circuit 20, $E_r$ is the reference voltage produced across the resistor 22, and $V_{os}$ is input offset voltage of the differential amplifier 23+24 obtained by selecting the resistances of the resistors 27 and 28 different from each other, then, the number of revolutions N of the DC motor 1 is represented by the following equation (2):

$$N = \frac{1}{K_a}\left\{\left(\frac{R_1 \cdot R_2}{R_3} - R_a\right)I_a + \frac{R_1 \cdot R_2}{R_3} \cdot I_r + \frac{R_2 + R_3}{R_3}\cdot\left(\frac{R_5}{R_4 + R_5}\cdot V_{ref} - V_{os}\right)\right\} \quad (2)$$

$$= \frac{1}{K_a}\left\{\left(\frac{R_1 \cdot R_2}{R_3} - R_a\right)I_a + \frac{R_1 \cdot R_2}{R_3}\cdot I_r + \frac{R_2 + R_3}{R_3}\cdot(E_r - V_{os})\right\}.$$

Provided that the bridge is constructed so as to fulfil the equilibrium condition of the equation (1):

$$R_1 \cdot R_2 = R_3 \cdot R_a \quad (1),$$

from the equations (1) and (2), the number of revolutions N can be represented as follows:

$$N = \frac{1}{K_a}\left(\frac{R_1 \cdot R_2}{R_3}\cdot I_r + \frac{R_2 + R_3}{R_3}\cdot\left(\frac{R_5}{R_4 + R_5}\cdot V_{ref} - V_{os}\right)\right). \quad (3)$$

The equation (3) shows that the number of rotations N is not relevant to the armature current $I_a$, which is proportional to the load torque.

In this circuit, the gradation $\Delta N/\Delta V_{cc}$ of the numner of rotations with respect to variation of the voltage of the DC power source 6 is given as follows from the equation (3):

$$\frac{\Delta N}{\Delta V_{cc}} = \quad (4)$$

$$\left(\frac{\Delta N}{\Delta V_{cc}}\right)I_r + \left(\frac{\Delta N}{\Delta V_{cc}}\right)V_{ref} + \left(\frac{\Delta N}{\Delta V_{cc}}\right)V_{os},$$

wherein $$\left(\frac{\Delta N}{\Delta V_{cc}}\right)I_r = \frac{1}{K_a}\cdot\frac{R_1 \cdot R_2}{R_3}\cdot\frac{\Delta I_r}{\Delta V_{cc}}, \quad (5)$$

-continued $$\left(\frac{\Delta N}{\Delta V_{cc}}\right) V_{ref} = \frac{1}{K_a} \cdot \frac{R_2 + R_3}{R_3} \cdot \frac{R_5}{R_4 + R_5} \cdot \frac{\Delta V_{ref}}{\Delta V_{cc}}, \quad (6)$$

$$\left(\frac{\Delta N}{\Delta V_{cc}}\right) V_{os} = -\frac{1}{K_a} \cdot \frac{R_2 + R_3}{R_3} \cdot \frac{\Delta V_{os}}{\Delta V_{cc}}. \quad (7)$$

As has been elucidated, in this apparatus the transistor 17 for feeding the current $I_r$ to the constant voltage circuit 20 and the transistor 18 for feeding the current to the differential amplifier 23+24 form current mirror circuits with the transistor 16, current of which is controlled by the constant current circuit 19.

When the voltage of the DC power source 6 changes, the emitter-collector voltages of the transistors 17 and 18 change to some extent. As a result, by the Early effect of the transistors 17 and 18, their collector currents change somewhat, and accordingly the voltage $V_{ref}$ of the constant voltage circuit 20 and the offset voltage $V_{os}$ of the differential amplifier 23+24 also change. If the apparatus is constructed so that the change of the revolution speed due to the changes of the current $I_r$ fed to the constant voltage circuit 20 (equation 5) and change of the revolution speed due to the change of the reference voltage $V_{ref}$ (equation 6) are compensated by the change of the revolution speed due to the change of the offset voltage $V_{os}$, then the change of the revolution speed due to the change of the voltage of the DC power source 6 (equation 7) can be eliminated. For that purpose, in order to fulfil the condition of $$\frac{\Delta N}{\Delta V_{cc}} = 0, \quad (8)$$

the following condition is necessary:

$$R_1 \cdot R_2 \cdot \frac{\Delta I_r}{\Delta V_{cc}} + (R_2 + R_3) \cdot \frac{R_5}{R_4 + R_5} \cdot \frac{\Delta V_{ref}}{\Delta V_{cc}} = \quad (9)$$

$$(R_2 + R_3) \cdot \frac{\Delta V_{os}}{\Delta V_{cc}}.$$

Therefore, the resistors 27 and 28 are selected so as to fulfil the condition of the equation (9). By so designing, the revolution speed or number of rotations of the DC motor 1 can be controlled irrespective of the change of the DC power source voltage.

As shown in FIG. 3, using a hypothetical example wherein the resistances of the resistors 27 and 28 are 170Ω and 100Ω, respectively, and the circuit data is depicted below,

| | |
|---|---|
| rated $V_{cc}$ | 3 V, |
| rated collector current of transistor 16 | 150 μA, |
| rated collector current of transistor 17 | 900 μA, |
| rated collector current of transistor 18 | 500 μA, |
| resistance of resistor 27 | 170 Ω |
| resistance of resistor 28 | 100 Ω |
| Then, the following result is obtained | |
| (1) when $V_{cc}$ is decreased to | 1.8 V, |
| then, $V_{os}$ becomes | 20.00 mV, |
| and the revolution speed is and | 2,200 rpm, |
| (2) when $V_{cc}$ is increased to | 4 V, |
| then $V_{os}$ becomes | 20.05 mV, |
| and the revolution speed is | 2,201 rpm. |

Accordingly, in this example the rate of the speed change is 0.02% per volt.

On the other hand, when the resistances 27 and 28 are selected (that is, such as shown in FIG. 2) and circuit data are identical to that in the hypothetical example above, then the following result is obtained:

| | |
|---|---|
| (1) When $V_{cc}$ is decreased to | 1.8 V, |
| then the revolution speed is and | 2,200 rpm, |
| (2) when $V_{cc}$ is increased to | 4 V, |
| then the revolution speed is | 2,215 rpm. |

Accordingly, in this example the rate of the speed change is 0.31% per volt.

Thus, by inserting the appropriate resistors 27 and 28 in the emitter circuits of the active load transistors 25 and 26, the change rate of the revolution speed of the motor is improved by 0.29% per volt.

Generally in the semiconductor integrated circuit, the absolute values per se of the resistors thereon scatter in a considerably wide range. However, by accurately defining the ratio of the resistances, minimizing scattering of ratios of the resistances of the resistors in one monolithic semiconductor chip is not so difficult and, furthermore, the scattering of the temperature characteristics of the elements on a monolithic semiconductor substrate is relatively small. Therefore, accurately designing the resistances of the resistors 27 and 28 and further resistors 3 and 4 together with other components of the apparatus on the same monolithic substrate of the IC, produces a speed control apparatus of very high accuracy and stability for a DC motor.

What is claimed is:

1. A speed control apparatus for a DC motor comprising:
   a bridge circuit to be completed by including as one arm, a first series circuit comprising a first resistance and said DC motor, the counter electromotive force of which is proportional to the revolutional speed of said DC motor, and as the other arm, a second series circuit comprising a second resistance and a third resistance,
   detection terminals comprising a first connection point of said DC motor and said first resistance, and a second connection point of said second resistance and said third resistance, for producing a voltage proportional to the counter electromotive force of said DC motor,
   a differential amplifier for amplifying signal of difference between a reference voltage and said produced voltage of said detection terminals,
   a current control means for controlling a current supplied to said bridge circuit by controlling a current control transistor inserted between a feeding terminal of said bridge circuit and a positive end of a power source, utilizing an output of said differential amplifier,
   a first transistor being connected by its emitter to said positive end of said power source and by its collector to a constant current circuit,
   a second transistor being connected by its emitter to said positive end of said power source and by its collector to a constant voltage circuit which produces said reference voltage, a third transistor being connected by its emitter to said positive end of said power source and by its collector to said differential amplifier, and said second and third transistors constituting current mirror transistors with respect to said first transistor.

2. A speed control apparatus for a DC motor in accordance with claim 1 wherein said differential amplifier comprises fourth and fifth transistors and further comprising sixth and seventh transistors which are connected by their collectors to said fourth and fifth differential amplifier transistors respectively, the emitters of said sixth and seventh transistors being connected to a negative terminal of a power source, said sixth transistor being connected by its base both to the collector of said sixth transistor and to the base of said seventh transistor.

3. A speed control apparatus for a DC motor in accordance with claim 2, further comprising:

a fourth resistance inserted between the emitter of said sixth transistor and the negative end of said power source, a fifth resistance inserted between the emitter of said seventh transistor and the negative end of the said power source, the values of said fourth resistance and the fifth resistance being different from each other.

4. A speed control circuit for a DC motor, comprising:

first, second, and third resistances, adapted to be connected with said DC motor in a bridge configuration having first, second, third, and fourth junctures, said first resistance being connected to one side of said motor at said first juncture, and to one side of said third resistance at said fourth juncture, said second resistance being connected to the other side of said motor at said third juncture, and to the other side of said third resistance at said second juncture, the voltage between said first and second junctures being proportional to the counter electromotive force of said DC motor;

means, including a constant voltage circuit, for generating a reference voltage indicative of a desired motor speed;

a differential amplifier, responsive to said reference voltage and said signal proportional to counter electromotive force, for generating a difference signal;

current control means, for controllably supplying current to said bridge configuration, said current control means including a current control transistor, responsive to said difference signal, for controllably effecting a current path between a positive potential and said bridge third juncture;

said bridge fourth juncture being connected to ground potential;

a constant current source;

a current mirror circuit, comprising first, second, and third transistors, each having emitter, collector, and base, the base of each of said first, second, and third transistor being connected to the collector of said first transistor, the emitter of each of said first, second, and third transistors being connected to said positive potential, and the collectors of said first, second, and third transistors being connected to said constant current source, said constant voltage circuit, and said differential amplifier, respectively.

5. The circuit of claim 4, wherein said differential amplifier comprises fourth and fifth transistors, each having emitter, collector, and base, the emitters of said fourth and fifth transistors each being connected to the collector of said third transistor, the base of said fourth transistor being connected to said means for generating a reference voltage, and the base of said fifth transistor being connected to said bridge second juncture;

said circuit further comprising sixth and seventh transistors each having emitter, collector, and base, the collectors of said sixth and seventh transistors being connected to the collectors of said fourth and fifth transistors, respectively, the bases of said sixth and seventh transistors being connected in common, and the collector of said sixth transistor being further connected to the bases of said sixth and seventh transistors, the emitters of said sixth and seventh transistors being connected to ground potential.

6. The circuit of claim 4, wherein said differential amplifier comprises fourth and fifth transistors, each having emitter, collector, and base, the emitters of said fourth and fifth transistors each being connected to the collector of said third transistor, the base of said fourth transistor being connected to said means for generating a reference voltage, and, the base of said fifth transistor being connected to said bridge second juncture;

said circuit further comprising sixth and seventh transistors each having emitter, collector and base, the collectors of said sixth and seventh transistors being connected to the collectors of said fourth and fifth transistors, respectively, the bases of said sixth and seventh transistors being connected in common, and the collector of said sixth transistor being further connected to the bases of said sixth and seventh transistors, the emitters of said sixth and seventh transistors being coupled to ground potential through fourth and fifth resistances, respectively, said fourth and fifth resistances being of different value.

* * * * *